United States Patent [19]

Isenberg et al.

[11] 3,757,982

[45] Sept. 11, 1973

[54] THERMALLY INSULATED CONTAINER

[75] Inventors: Lionel Isenberg, Downey; Ernest T. Hillberg, La Habra, both of Calif.

[73] Assignee: North American Rockwell Corporation, El Segundo, Calif.

[22] Filed: June 11, 1971

[21] Appl. No.: 152,125

[52] U.S. Cl............................. 220/9 C, 220/9 LG
[51] Int. Cl............................................ B65d 25/18
[58] Field of Search.................. 220/9 LG, 9 C, 9 F, 220/9 M; 114/74 A

[56] References Cited
UNITED STATES PATENTS

| | | | |
|---|---|---|---|
| 3,303,617 | 2/1967 | Hessburg, Jr. et al............... | 220/9 F |
| 3,167,933 | 2/1965 | Beckman et al. .................... | 220/9 C |
| 3,139,206 | 6/1964 | Matsch................................ | 220/9 C |
| 3,272,374 | 9/1966 | Loveday et al..................... | 220/9 LG |
| 3,411,656 | 11/1968 | Jackson ............................. | 114/74 A |

FOREIGN PATENTS OR APPLICATIONS

919,587   2/1963   Great Britain..................... 220/9 LG

Primary Examiner—Lloyd L. King
Attorney—L. Lee Humphries et al.

[57] ABSTRACT

An insulated container for transporting low temperature liquids has a strong, rigid outer shell internally lined with first and second layers of polyurethane foam with the second layer directly in contact with the contained liquid. Between the layers of foam may be interposed a composite membrane made of, for example, a combination of one or more metal foil layers, an impervious resinous material, and a plurality of temperature sensing devices spaced throughout the membrane to detect any degradation of the insulation. The interior foam surface is preferably reinforced with a scrim cloth. Means are used over weld seams in the rigid outer shell and at the weld corners to allow flexing without cracking the foam.

15 Claims, 11 Drawing Figures

Patented Sept. 11, 1973

INVENTORS
LIONEL ISENBERG
ERNEST T. HILLBERG
BY
*Dominick Nardelli*
ATTORNEY

Patented Sept. 11, 1973

INVENTORS
LIONEL ISENBERG
ERNEST T. HILLBERG

BY

ATTORNEY

Patented Sept. 11, 1973

INVENTORS
LIONEL ISENBERG
ERNEST T. HILLBERG

ATTORNEY

Patented Sept. 11, 1973  3,757,982

INVENTORS
LIONEL ISENBERG
ERNEST T. HILLBERG

ATTORNEY

Patented Sept. 11, 1973 3,757,982

INVENTORS
LIONEL ISENBERG
ERNEST T. HILLBERG

BY

ATTORNEY 3,757,982

THERMALLY INSULATED CONTAINER

FIELD OF INVENTION

This invention relates to a container for a low temperature liquid and, more particularly, to an insulation system for the interior of containers having an impact resistant shell so that the container could hold liquids whose normal boiling temperature may be as low as −320°F.

BACKGROUND OF THE INVENTION

With the ever increasing demand for fuels, especially low molecular weight hydrocarbons that are in the vapor state at standard pressure and temperatures, the transportation and storage of these gases, under present state of the art methods, is relatively expensive because they are preferably stored under pressure for reasons of economy and safety. Since large pressure vessels are heavy and expensive, industry is looking to a more economical and safer container for storing these hydrocarbons, preferably in the liquid state at reduced temperatures and at atmospheric or near atmospheric pressures. The prior art, such as U.S. Pat. No. 3,502,239, suggests that a container for propane, which is liquid at a moderately low temperature, −50°F., could have a low carbon steel outer shell and an internal insulation lining made of a first layer of polyurethane foam, a polyepoxide membrane impermeable to stench, and a second layer of polyurethane foam which is denser than the first layer and in contact with the cold liquid. This arrangement should keep the outer steel shell at ambient temperature and ductile. However, temperatures lower than that of liquid propane will tend to crack the foam and any minute fissure in the foam insulation due to thermal stresses will afford the cold liquid an opportunity to migrate towards the outer steel shell thereby lowering its temperature and increasing its brittleness. The prior art suggests methods for reinforcing the foam, i.e., as taught by U.S. Pat. No. 3,322,868, but this method requires that the reinforced foam be made in blocks and then set in place leaving inherent cracks in the insulation, since there is no assurance that the blocks could be bonded together in a leakproof structure with the required stress resistant characteristics. The prior art also teaches a method to place reinforcements in the foam as it is poured into place. This method inherently produces a weaker foam than the block foam because of the nature, location, and method of reinforcement introduction.

OBJECTS OF THE INVENTION

An object of this invention is to provide a low cost and more efficient and economical storage container for low temperature liquids.

Another object is to provide a safer storage container for low temperature liquids with means for detecting degradation in the insulation.

Still another object of this invention is the provision of an efficient insulation system for the storage of low temperature liquids wherein the outer shell of the container may be formed of low cost, low carbon steel that will be maintained essentially at ambient temperature and hence will remain ductile.

Yet another object of this invention is the provision of a low temperature insulation system having means for the detection and location of leaks in the innermost foam layer.

These and other objects and features of advantage will become more apparent after studying the description of the preferred embodiments together with the drawings.

DETAILED DESCRIPTION OF THE DRAWINGS

Figure 1:
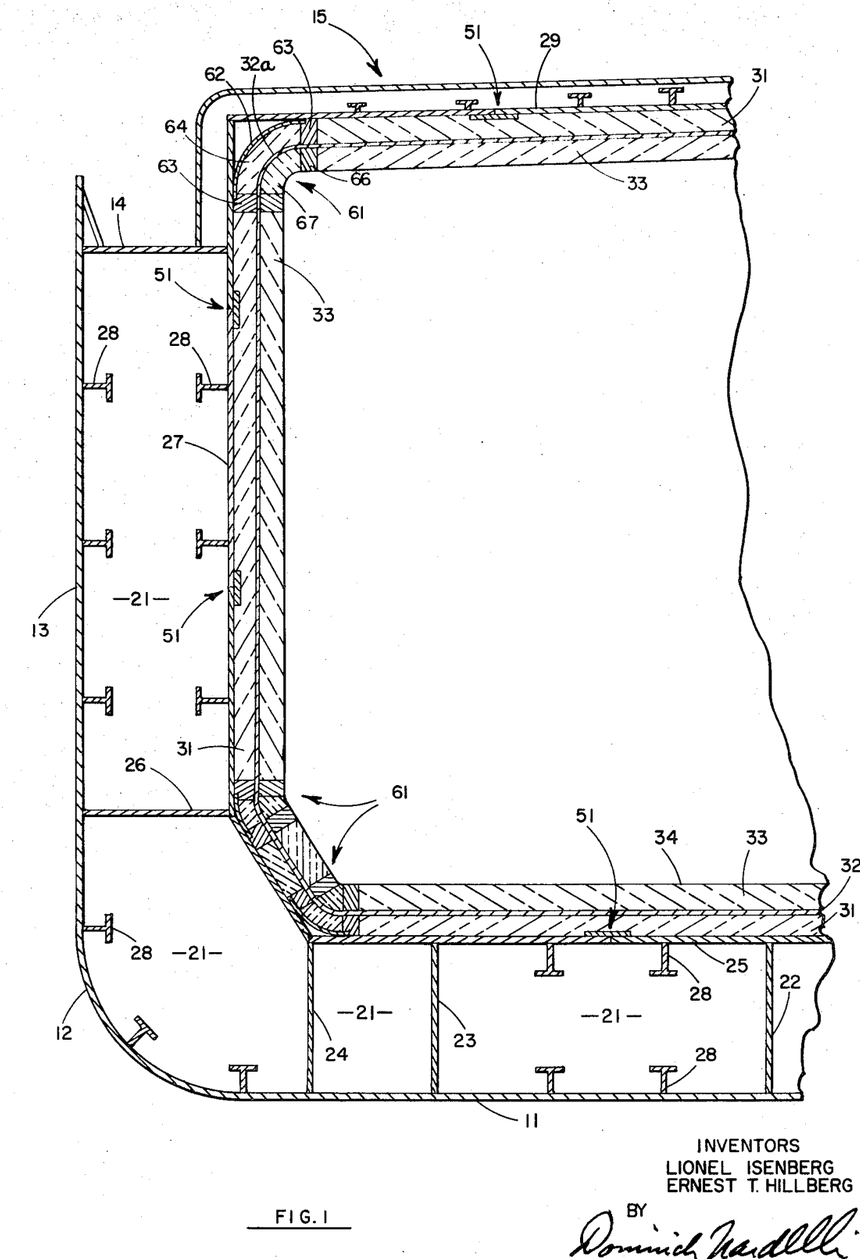
FIG. 1 is a midship transverse section of one side of a marine tanker incorporating the novel wet wall insulation system of this invention.

FIG. 1 represents, schematically, a transverse midsection of one side of a marine tanker insulated in accordance with the teaching of the insulation system of this invention. The tanker has an outer hull, including a flat keel 11, a bilge 12, outer bulkhead 13, a deck 14, and a super structure 15. Inside the hull are suitable stiffeners, such as a transverse plate stiffener 21 and longitudinal plates 22, 23, 24, extending from the keel 11 to an innerbottom deck 25. In addition, a longitudinal plate 26 extends from the outer bulkhead 13 to an inner bulkhead 27. Suitable longitudinal T-stiffeners 28 are also shown. The deck 25 and bulkhead 27 define a hold in which is to be carried cryogenic liquids. The hold is covered with a suitable steel deck 29 with the necessary stiffeners. The description of the tanker up to this point is common in the art.

Since one of the features of this invention is that the tanker may be made of cold rolled carbon steel, the steel must be protected from the low temperature. Next to the steel plates is suitably bonded a first layer 31 of the insulation foam made of, for example, polyurethane foam. This first or outer layer 31 may be applied by a suitable spray, pour or froth process that forms the foam in place or may be placed in blocks in order to give assurance that the layer would have a uniform thickness and planar surface. In the last case, to ensure more positive bonding, foaming adhesive, as described hereinafter, may be used for attaching the foam blocks to the steel plate. Such polyurethane foam is preferably of a density of from 2 to 7 pounds per cubic foot. The prior art in similar circumstances (where the insulating polyurethane is internally located and exposed to the low temperature liquid) has suggested only substantially higher density foam with the purpose in mind of achieving sufficient strength because of the concern over the possibility of overstressing under thermal contraction. Applicants structure, on the other hand, utilizes a lower density polyurethane foam, achieving greater thermal efficiency and substantial weight reduction while still obtaining the necessary structural strength. This first layer 31 is then lined with a novel membrane 32 which will also be more fully described hereinafter. The membrane 32 is impermeable to the low temperature liquid and the vapors liberated therefrom. The membrane 32 is enclosed by a second or inner layer 33 of insulation foam. The second layer 33 is made of similar material as the first layer 31. It is particularly advantageous that the second layer be of the same density as the first layer. In this way, an optimum thermal load-bearing efficiency can be attained. Thus, it is not necessary, according to the teaching herein, for the foam layer next to the cryogenic liquid, to be of greater density nor to have an internal or subsurface mesh for strengthening. A great saving in weight and cost is thus achieved. Through the use of foam at about 4 pounds per cubic foot, an optinum is achieved. On the second layer 33 is suitably bonded a scrim cloth 34 (more clearly shown in FIG. 2) made of, for example, nylon filament with a mesh size of one-eighth to one-fourth inch and a filament diameter of 0.0005 inch. The purpose of the scrim cloth 34 is to assist the inner foam layer 33 to withstand damage from dropped objects and to minimize thermal shock. Nylon, being stronger than the foam, strengthens the surface and minimizes crack development. It also resists the thermal stresses placed upon the foam.

Figure 2:
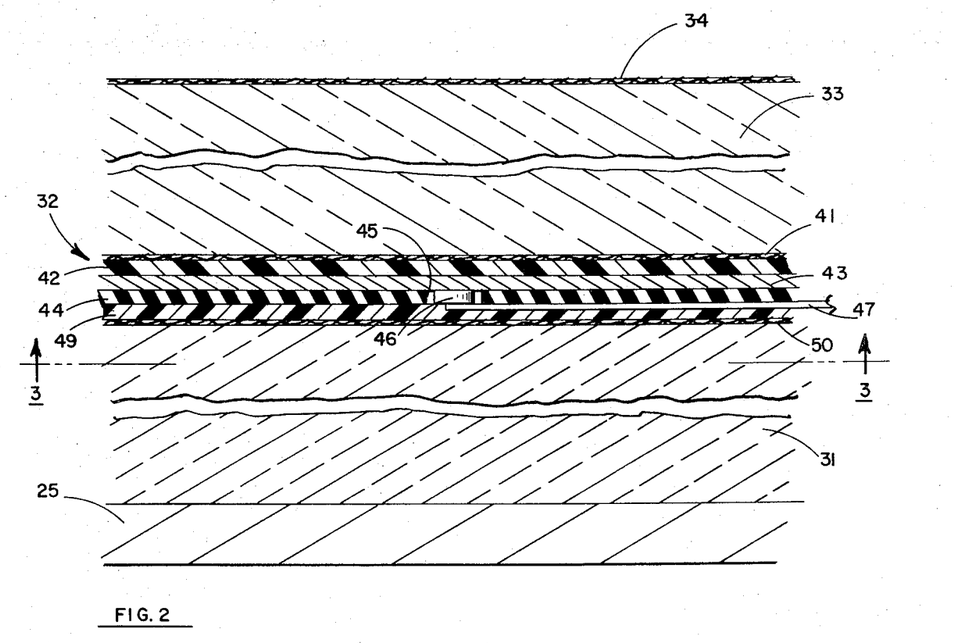
FIG. 2 is an enlarged cross-section of a portion of the foam insulation system disposed next to a steel plate that shows one embodiment of the thermal membrane therein.
Figure 3:
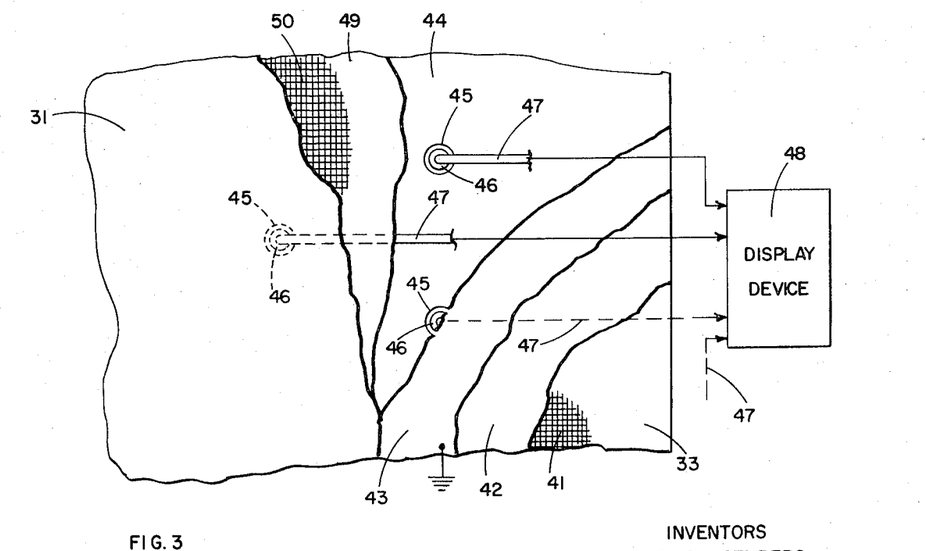
FIG. 3 is a plan view of a portion of one embodiment of the membrane within the insulation as taken substantially on line 3—3 of FIG. 2 in the direction of the arrows showing the leads from the temperature sensors coupled to a display device.

In FIGS. 2 and 3 the novel details of one embodiment of the membrane 32 is shown. One feature of the membrane, besides being impervious, is for detecting faulty insulation. The membrane 32 includes a light, coarse weave nylon fabric 41 (similar to the scrim cloth 34) bonded to a mylar film 42 which is, for example, 0.0005 inch thick. Cross tie or rip stop nylon are especially suited for such purpose. Bonded to film 42 is a metallic film 43 made of, for example, of aluminum. The metallic film 43 is thick enough to have a relatively low electrical resistance and thin enough to be flexible to flex with the mylar film 42. The metallic film 43 acts as a thermal conductor and thus can be used to indicate the location where a leak of cryogenic liquid exists. It may also be used in certain embodiments as an electrical conductor, a ground, or a ground plane, as explained hereinafter. On the metallic film 43 is coated an electrical insulating layer 44 made of, for example, polyester. In this layer 44 are formed openings 45 of about one to ten millimeters in diameter, preferably disposed symetrically on the membrane 44. These openings 45 should preferably be placed close together for reasons that will be explained hereinafter. Temperature sensing elements 46 are disposed in respective openings 45. The element 46 has a characteristic for changing its resistance in response to temperature as in a typical thermistor. Each element 46 is suitably attached to the metallic film 43 and to a metallic ribbon 47. In FIG. 3 the electrical circuit is completed through conductor 47, the temperature sensor (such as a thermistor, thermocouple, etc.) thence through metal film 43 to ground. Various other electrical circuits, known to those skilled in the art, may be used. The metallic film 43 need not necessarily be grounded nor need it be part of the electrical circuit. Some temperature sensing elements have two conductors and thus might not use the film 43 as a part of the electrical circuit. The ribbons 47, coupled to the respective thermistor elements 46, preferably are disposed parallel to each other (as shown in FIG. 3) so that they can be conveniently coupled to a display device 48 which monitors the resistance of each thermistor coupled thereto in a standard manner. Over the ribbons 47 and on exposed portions of the layer 44 is bonded another mylar film 49, and, in turn, another scrim cloth 50. The function of the scrim cloths 41 and 50 is to provide a surface that can be more readily bonded to the respective foam insulation layers 31 and 33.

The thermistor elements 46 and display device 48 are used in the following manner to determine the efficiency or quality of the insulation during operation. Since the inner foam layer 33 is relatively uniform in thickness, the display device 48, which monitors the resistance values for the respective thermisters, will indicate values that are substantially equal. However, as will be seen hereinafter, these values need not be equal, only change in value needs to be observed to indicate a dangerous condition. Since the elements 46 are relatively close together, any break in the inner foam layer will transmit the cold temperature closer to at least one of the thermistors. Since the amount of insulation between thermistors and cryogenic liquid is less now, the thermistors, adjacent to the break, are in an environment of lower temperature causing a corresponding change in the resistance value thereof. This change is monitored by the display device 48. By a comparison of the relative temperature change in the adjacent elements, the exact location of the break can be determined and automatically displayed. Since the membrane 32 is strong and impermeable to the cryogenic liquid, the respective steel plates of the ship structure, which are sensitive to the embrittling effect of low temperature, are safe until the damaged insulation can be repaired.

Figure 4:
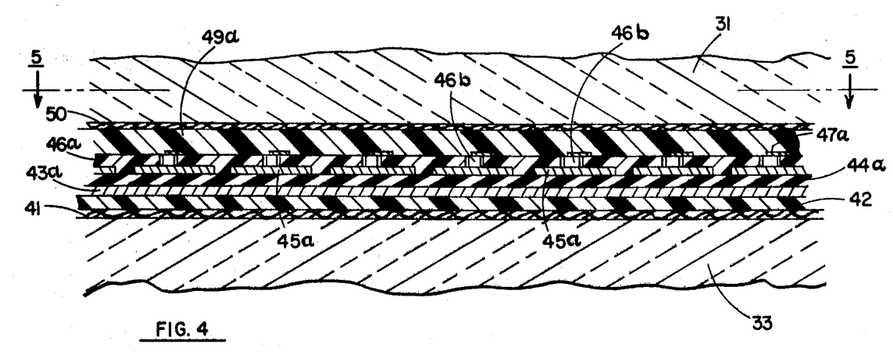
FIG. 4 is an enlarged cross-section of a portion of the foam insulation showing another embodiment of the thermal membrane therein.
Figure 5:
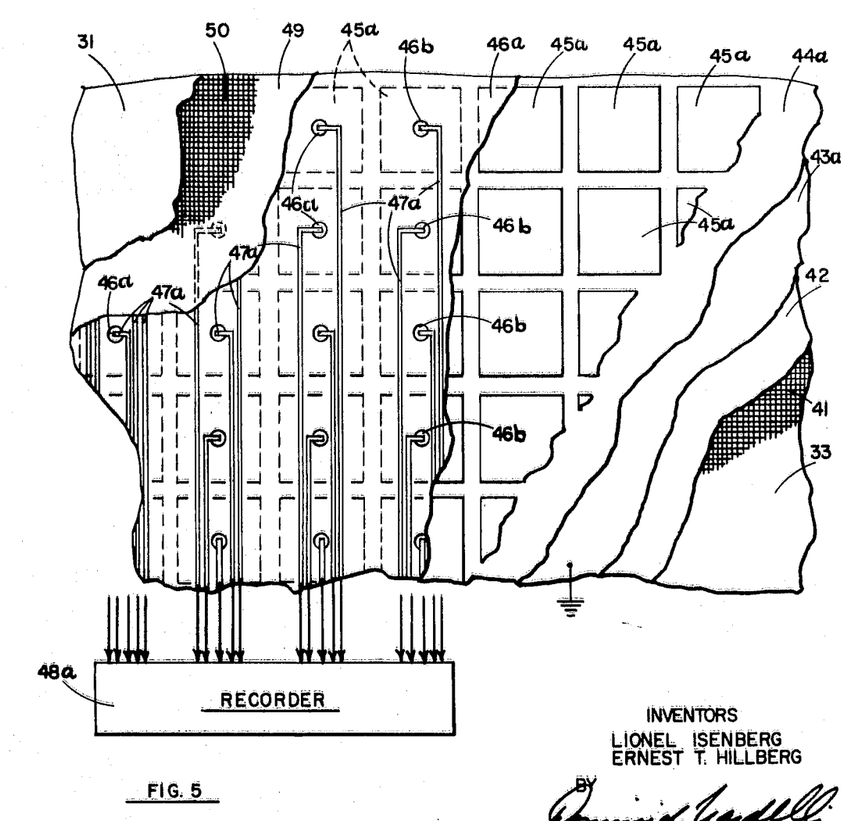
FIG. 5 is a plan view of the embodiment of the membrane shown in FIG. 4 with a portion broken away to show the construction thereof.

Referring to FIGS. 4 and 5, another leak detection membrane is shown. The membrane is also disposed between insulation layers 31 and 33 and has scrim cloths 41 and 50 on opposite sides thereof. Adjacent to the scrim cloth 41 is also the mylar film 42 with an aluminum film 43a bond thereto. This aluminum film 43a is different from aluminum film 43 (FIG. 2) in that this film 43a may be as thin as 0.0001 inch thick and may, therefore, be, for example, vapor deposited directly on the mylar film 42. This film 43a is also used as the ground plane. On the aluminum film 43a is bonded a dielectric film 44a having the properties wherein its dielectric constant, its resistance, or both, vary with temperature. Printed on the film 44a is a pattern of squares 45a made of, for example, aluminum. Over the printed pattern of squares 45, hole 46b is emplaced over a respective square 45a. On the mylar film 46a are printed a plurality of conductive paths 47a, each of which communicates with a respective hole 46b and making electrical contact with a respective square 45a. These paths 47a are all connected to a display device 48a. The mylar film 49 is bonded over the paths 47a. The display device 48a detects any change in the capacitance, resistance, or both, between each square 45a and the metallic film 43a. Any break in the inner foam layer 33 or microscopic leak will cause a drop in temperature in the dielectric film 46a which drop will cause a change in the resistance or capacitance, or both, between the adjacent square 45a and the metallic film 43a. This change will be detected and shown by the display device 48a to indicate the location of the foam failures or damage.

Figure 6:
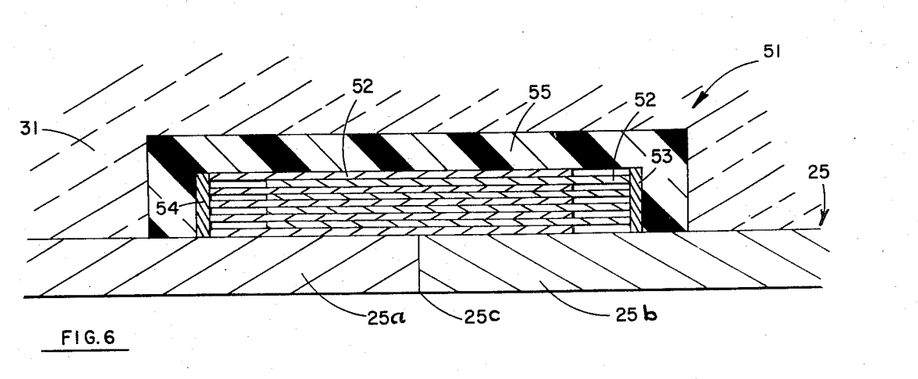
FIG. 6 is an enlarged cross-section of one embodiment of a detail of the insulation system showing a means over a butt weld seal for inhibiting the foam from cracking.
Figure 7:
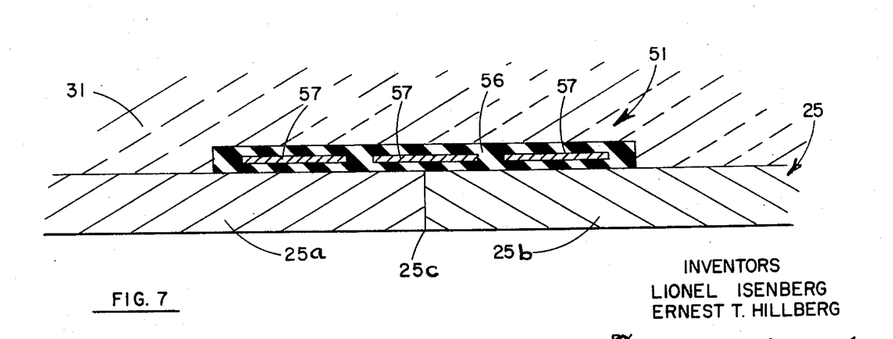
FIG. 7 is an enlarged cross-section of another embodiment of the foam crack-inhibiting means over a butt weld seam.

Referring to FIGS. 6 and 7, when two steel plates such as plates 25a and 25b are butt welded, forming a weld seam 25c to make the deck 25, the area next to the weld seam 25c would be subjected to a different deformation than in the more remote areas of the steel plates. In other words, the bending curvature changes abruptly at the weld seam. Since the foam insulation in layer 31 has a relatively low modulus of elasticity, means 51 are provided adjacent to the weld seam 25a for bridging the abrupt discontinuity of the bending structure to prevent the foam from cracking. In FIG. 6, the means 51 includes a plurality of steel plates 52 having a thickness of about 0.01 inch. Alternate plates 52 are welded to a relatively thin steel bar 53 which is, in turn, welded to plate 25b while the remaining plates 52 are welded to another relatively thin steel bar 54 which, in turn, is welded to steel plate 25a. The spacing of the bars 53 and 54 from the seam 25c is, for example, 12 inches or a sufficient distance so that the high temperatures attained during welding of seam 25c will not have affected the quality of the plates. The number of plates 52 required depends on the application and can be readily determined in the field. The plates 52 are able to slide, one over the other, as the deck 28 bends. The sheets 52 and bars 53 and 54 are covered with rubber-like plastic 55, for example neoprene, to which the foam in layer 31 is bonded. In FIG. 7, the means 51 includes a relatively thick sheet 56 made of, for example, neoprene bonded over the weld seam 25c. To control the stiffness of the sheet 56, steel bars 57 having a thickness of about 0.01 inch are bonded within the sheet. The foam in layer 31 is bonded to the sheet 56.

Figure 8:
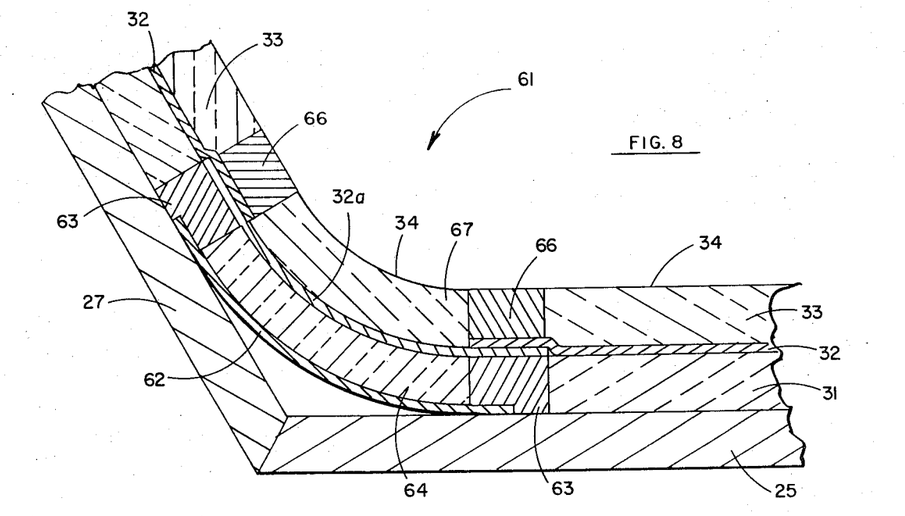
FIG. 8 is an illustration of an embodiment of a means for inhibiting foam cracking at a corner weld seam.

Referring to FIG. 8, the construction of the insulation at a typical corner is shown. Since the deck and bulkhead plates 25 and 27 at the corner flex relative to each other and, since the insulation tends to contract and expand, a means 61 is included at the corners which allows the plates to flex and the insulation to expand without degrading the insulation properties. The corner shown is a typical corner although it is shown to be more than 90°. The same features apply to corners of any angle and to corners formed by more than two intersecting planes. The means 61 includes a curve sheet 62 made of, for example, sheet steel or reinforced plastic, which has a relatively high modulus of elasticity or which in some applications, for example, may be a relatively strong flexible material such as reinforced rubber. This sheet 62 is bonded to the deck 25 and bulkhead 27 at least 12 inches from the corner. At the point of attachments are bonded shear blocks 63 made of, for example, honeycomb filled with polyurethane foam. The characteristics of the honeycomb and foam are such that any expansion in the layer 31 on the deck 25 or on the bulkhead 27 will be restrained by the shear blocks 63, since they are relatively stiff. The space between the blocks 63 is filled with a lower density foam than that comprising blocks 63 and 64, chosen for its insulating characteristics. The membrane 32, preferably, is terminated and bonded to the blocks 63 and another membrane 32a, which is similar to membrane 32, is placed over foam 64 for ease in fabrication because placing a continuous membrane 32 around the corner would be difficult. Membrane 32a is bonded to the blocks 63. Additional shear blocks 66 are bonded to the membranes opposite the blocks 63. Thus, the inner layer 33 of foam terminates at these blocks 66 as shown. The corner space between these blocks 66 is also filled with a low density foam 67.

As an alternative, the curve sheet 62 may be omitted and the void filled with the foam 64 to the corner where the deck and bulkheads intersect. Another alternative is to replace the membrane 32a with a steel sheet that may be corrugated so that it flexes to form a developed surface, or dimpled so that it flexes to form a warped surface to provide a membrane with a relatively low modulus of elasticity.

Figure 9:
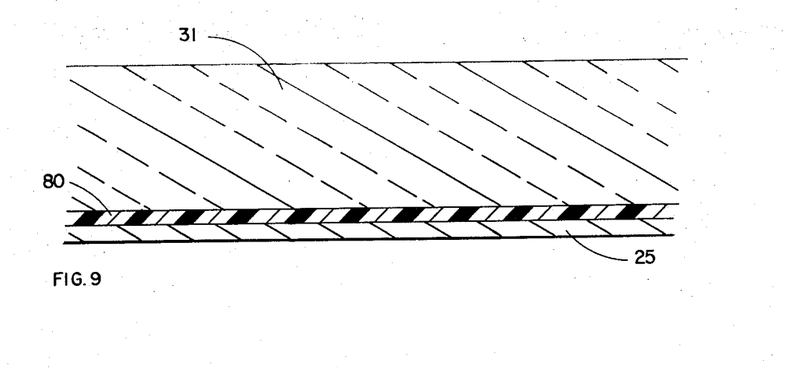
FIG. 9 shows a cross-section of a prefabricated insulation block bonded to the steel plate with a foaming bonding agent.

Referring to FIG. 9, there are applications where the insulation layer 31 is required to be constructed of prefabricated blocks. This may happen when the layer 31 is to be reinforced with, for example, honeycomb. Insulation that requires reinforcement is preferably made in blocks for economy and quality control. Then the surface of the block which is to be placed against the steel plates may not be in continuous contact with the steel surface. For example, between the deck plate 25 and the layer 31 may be disposed a polyurethane foam 80 having the characteristics of relatively high density (2 – 40 pounds per cubic foot), good adhesiveness, and having relatively long reaction time, such as 10 minutes or more, to allow a person time to place the block before the plastic starts to foam. Since the foaming starts while the block is in position, it is not necessary that the block touch the steel and the foam 80 will fill the voids.

Figure 10:
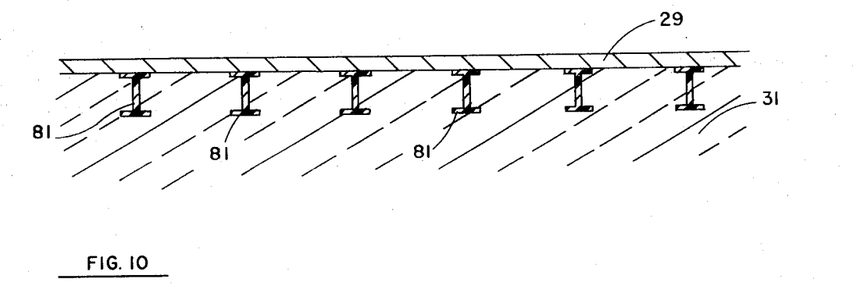
FIG. 10 shows a cross-section of one embodiment of a means for securing foam insulation to an overhead.
Figure 11:
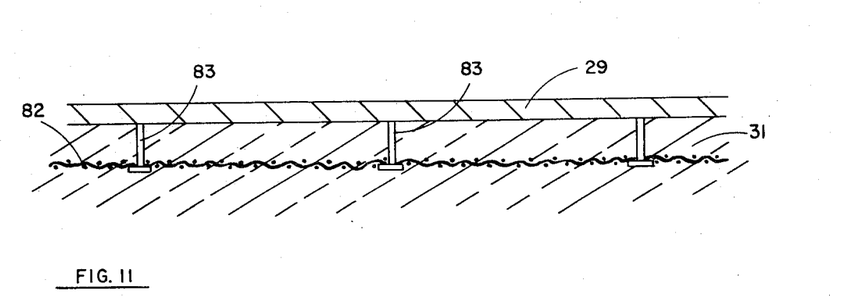
FIG. 11 shows a cross-section of another embodiment of a means for securing foam insulation to an overhead.

Referring to FIG. 10 and 11, means are shown for ensuring that foam layers 31 and 33 are retained against an overhead such as the under side of deck 29. In FIG. 10, I-section plastic beams 81 are bonded to the overhead 29 by suitable means and the layer 31 is foamed in place. In FIG. 11, a nylon mesh 82 is suspended from the overhead 29 by suitable spacers 83 before the layer 31 is foamed in place.

Having described the invention by way of examples, the invention is not to be considered limited to the disclosed embodiments, but the invention includes all embodiments falling within the scope of the appended claims.

What is claimed is:

1. A thermally insulated container for bulk storage of low temperature liquids, said container having a rigid impact resistant outer shell and an internal lining, said lining including:
   a first layer of polyurethane foam having a density of from 2 to 7 pounds per cubic feet disposed in substantially continuous contact with the inner surface of said shell member,
   a membrane impervious to said liquids being in substantially continuous contact with the inner surface of said first layer, and a second layer polyurethane foam of substantially the same density as said first layer in substantially continuous contact with said membrane on one of its surfaces and in contact with the low temperature liquid on its other surface.

2. A thermally insulated container for bulk storage of low temperature liquids, said container having a rigid impact resistant outer shell and an internal lining, said lining including:
- a first layer of insulation foam disposed in substantially continuous contact with the inner surface of said shell member,
- a membrane impervious to said liquids being in substantially continuous contact with the inner surface of said first layer,
- a second layer of insulation foam in substantially continuous contact with said membrane, and
- scrim means disposed on the inner surface of said second layer for strengthening said surface both as to mechanical and thermal loads, said inner surface of said second layer of foam being disposed for contact with said low temperature liquids.

3. A thermally insulated container for bulk storage of low temperature liquids, said container having a rigid impact resistant outer shell and an internal lining, said lining including:
- a first layer of polyurethane foam having a density of from 2 to 7 pounds per cubic foot disposed in substantially continuous contact with the inner surface of said shell member,
- a membrane impervious to said liquids being in substantially continuous contact with the inner surface of said first layer and comprised at least in part of a thermal conductor,
- a second layer of polyurethane foam of substantially the same density as said first disposed in substantially continuous contact with said membrane on one of its surfaces and disposed for contact with said low temperature liquid on its other surface, and
- a plurality of temperature sensors in proximity to said membrane and means for monitoring the output of said temperature sensors.

4. A thermally insulated container for bulk storage of low temperature liquids, said container having a rigid impact resistant outer shell and an internal lining, said lining including:
- a first layer of polyurethane foam having a density of from 2 to 7 pounds per cubic foot disposed in substantially continuous contact with the inner surface of said shell member,
- a membrane impervious to said liquids being in substantially continuous contact with the inner surface of said first layer,
- a second layer of polyurethane foam of substantially the same density as said first layer in substantially continuous contact with said membrane on one of its surfaces and in contact with the low temperature liquid on its other surface,
wherein said membrane comprises:
- a first mylar sheet,
- a metallic film bonded to said first mylar sheet,
- an electrical insulating film having a plurality of spaced openings bonded to said metallic film,
- circuit elements responsive to temperature variations disposed in respective openings and attached to said metal film,
- metallic ribbons coupled to said circuit respective elements and bonded to said electrical insulation film, and
- a second mylar sheet covering said ribbons and bonded to said electrical insulation film.

5. The container of claim 4 wherein:
said first layer of foam insulation is bonded to one side of said membrane and the outer layer of foam insulation is bonded to the other side of said membrane.

6. The container of claim 3 wherein said membrane comprises:
- a first mylar sheet,
- a metallic film bonded to said first mylar sheet,
- a dielectric film bonded on said metallic film, said dielectric film having the electrical properties which change with temperature,
- a plurality of metallic film type elements bonded to said dielectric film,
- an electrical insulating film having a plurality of spaced openings bonded over said metallic film type elements with each one of said openings disposed over a respective element,
- metallic ribbons bonded to said insulating film and making electrical contact to a respective element through a respective opening, and
- a second mylar sheet bonded to and covering said ribbons.

7. The container of claim 6 wherein means are provided for monitoring the capacitance between said metallic film and each one of said elements.

8. The container of claim 6 wherein means are provided for monitoring the resistance between said metallic film and each one of said elements.

9. A thermally insulated container for bulk storage of low temperature liquids, said container having a rigid impact resistant outer shell and an internal lining, said lining including:
- a first layer of insulation foam disposed in substantially continuous contact with the inner surface of said shell member,
- a membrane impervious to said liquids being in substantially continuous contact with the inner surface of said first layer, said membrane comprised at least in part of a thermally conductive material,
- a second layer of insulation foam in substantially continuous contact with said membrane, and
- a plurality of temperature sensors in proximity to said membrane, and means for monitoring the output of said temperature sensors.

10. The container of claim 9 wherein said membrane comprises:
- a first mylar sheet,
- metallic film bonded to said first mylar sheet,
- an electrical insulating film having a plurality of spaced openings bonded to said metallic film,
- a circuit element responsive to temperature disposed in respective openings and coupled to said metal film,
- a metallic ribbon coupled to said element and bonded to said insulation film, and
- a second mylar sheet covering said ribbon and bonded to said insulation film.

11. A thermally insulated container for bulk storage of low temperature liquids, said container having a rigid impact resistant outer shell and an internal lining, said lining including:

a first layer of insulation foam disposed in substantially continuous contact with the inner surface of said shell member, a membrane impervious to said liquids being in substantially continuous contact with the inner surface of said first layer, a second layer of insulation foam having one surface in substantially continuous contact with said membrane, and the other surface disposed for contact with said low temperature liquid, said first and second layer of insulation foam being substantially of the same density at any given location and said density being of from two to four pounds per cubic foot.

12. A thermally insulated container for bulk storage of low temperature liquids, said container having a rigid impact resistant outer shell and an internal lining, said lining including:

a first layer of insulation foam disposed in substantially continuous contact with the inner surface of said shell member, a membrane impervious to said liquids being in substantially continuous contact with the inner surface of said first layer, a second layer of insulation foam in substantially continuous contact with said membrane, first lightweight shear blocks disposed on each side of said corner, spaced therefrom and a first polyurethane foam block disposed between said shear blocks and having a substantially curved inner surface, a second membrane disposed on said curved surface and extending between said shear blocks, second lightweight shear blocks disposed on each one of said first shear blocks, a second polyurethane foam block disposed between said second shear block and having a substantially curved inner surface, and scrim cloth means disposed on the inner surface of said second layer of insulation foam and extending into the surface of said second shear block for strengthening.

13. The container of claim 12 wherein a flexible spring-like sheet is curved across said corner and said first foam block is disposed on said sheet.

14. The combination recited in claim 12 wherein is further included a flexible spring-like sheet between said first and second foam blocks.

15. A thermally insulated container for bulk storage of low temperature liquids, said container having a rigid impact resistant outer shell and an internal lining, said lining including:

a first layer of insulation foam disposed in substantially continuous contact with the inner surface of said shell member, a membrane impervious to said liquids being in substantially continuous contact with the inner surface of said first layer, a second layer of insulation foam in substantially continuous contact with said membrane, a first lightweight shear block abutting said first layer of insulation foam.

a second lightweight shear block abutting said second layer of insulation foam, said membrane extending between said shear blocks, and scrim means disposed on the inner surface of said second layer of insulation foam and extending into said shear block for strengthening.

* * * * *